(12) United States Patent
Davis et al.

(10) Patent No.: US 6,600,730 B1
(45) Date of Patent: Jul. 29, 2003

(54) SYSTEM FOR DISTRIBUTION OF SATELLITE SIGNALS FROM SEPARATE MULTIPLE SATELLITES ON A SINGLE CABLE LINE

(75) Inventors: Robert W. Davis, Woodbine, MD (US); Walter R. Kepley, Gaithersburg, MD (US); Robert D. Cassagnol, Silver Spring, MD (US); Douglas M. Dillon, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/137,262

(22) Filed: Aug. 20, 1998

(51) Int. Cl.[7] .............................. H04J 1/08; H04B 1/06
(52) U.S. Cl. ...................... 370/343; 370/480; 455/3.02; 455/12.1; 725/68
(58) Field of Search ................................ 370/480, 481, 370/486, 487, 485, 492, 343; 455/12.1, 13.1, 3.02; 725/68, 69, 70, 71; 343/772, 773, 781 R, 781 P (56) References Cited

U.S. PATENT DOCUMENTS

| | | | | |
|---|---|---|---|---|
| 5,119,509 A | | 6/1992 | Kang | |
| 5,345,591 A | * | 9/1994 | Tsurumaki et al. | ........ 455/3.02 |
| 5,584,064 A | * | 12/1996 | Nakamura | ................. 455/3.02 |
| 5,752,180 A | * | 5/1998 | Guo et al. | ................. 455/3.02 |
| 5,805,108 A | * | 9/1998 | Lennen | ...................... 342/357 |
| 5,805,975 A | * | 9/1998 | Green, Sr. et al. | ......... 455/3.02 |
| 5,898,455 A | * | 4/1999 | Barakat et al. | ............ 455/3.02 |
| 5,940,737 A | * | 8/1999 | Eastman | .................... 455/3.02 |
| 5,970,386 A | | 10/1999 | Williams | .................... 455/4.1 |
| 6,078,810 A | * | 6/2000 | Olds et al. | .................. 455/428 |
| 6,134,419 A | | 10/2000 | Williams | .................... 455/6.2 |
| 6,313,885 B1 | * | 11/2001 | Patel et al. | ................. 348/725 |
| 6,324,381 B1 | * | 11/2001 | Anselmo et al. | ........... 455/12.1 |
| 6,334,045 B1 | | 12/2001 | Green, Sr. et al. | ......... 455/3.02 |
| 6,397,038 B1 | * | 5/2002 | Green, Sr. et al. | ......... 455/3.02 |

* cited by examiner

Primary Examiner—Min Jung
(74) Attorney, Agent, or Firm—John T. Whelan; Michael W. Sales (57) ABSTRACT

A system for distributing separate multiple satellite communication services signals to receivers at a local earth site on a single cable line. A dual satellite antenna receives the signals from two separate satellites, each of which can correspond to a respective satellite communication service. The received satellite signals are processed into two separate frequency bands. A frequency converter using frequency division multiplexing converts at least one of the received frequency bands so as to position both of the frequency bands adjacent to each other. A summer receives the adjacent frequency bands and distributes them on a single cable line to receivers so that the receivers have access to the separate multiple satellite communication service signals on a single cable line. A demultiplexer coupled to the adjacent frequency bands from the summer enables the plurality of receivers at the output of the demultiplexer lines to obtain simultaneous access to both satellite communication services distributed over the single cable line to the receiver.

16 Claims, 7 Drawing Sheets

SYSTEM FOR DISTRIBUTION OF SATELLITE SIGNALS FROM SEPARATE MULTIPLE SATELLITES ON A SINGLE CABLE LINE

BACKGROUND OF THE INVENTION (a) Field of the Invention

The present invention relates in general to satellite receive earth stations and, more particularly, to a system for receiving satellite signals from separate and multiple satellites and distributing the signals received from the satellites on a single cable line.

(b) Description of Related Art

Satellite-based communication systems typically beam signals from a terrestrial antenna to a geostationary satellite. The satellite processes and "downlinks" the signals to terrestrial satellite receive antennas located within the satellite's coverage area or footprint. On-board transponders modulate signals to an assigned carrier frequency and polarity, then send the signals to an on-board antenna for transmission (downlinking) the satellite signals to earth for reception at individual receiver units.

At the individual receiver units at a local earth site, such as a household, a satellite receive antenna, typically comprising a parabolic dish antenna, reflects and concentrates the received satellite signals to a focal point.

Typically, such antennas include a low noise block (LNB) which amplifies, filters and shifts the incoming satellite signal to an intermediate frequency band for coupling to a set-top box or other integrated receiver and detector (IRD) associated with the receiver unit at the local earth site.

At present, there are several different satellite communication services available. For instance, one known direct-to-home digital satellite system now in operation uses an uplink signal modulated onto frequency bands between about 17.2 GHz and about 17.7 GHz. The satellites associated with this system shift the uplink signals to carrier frequencies ranging from approximately 12.2 GHz to approximately 12.7 GHz and transmit these frequency shifted transponder signals back to earth for reception at each of a plurality of individual receiver units in what may be termed a digital television broadcast satellite system or "DTV". Other satellite communication systems are presently available for transmitting digital information to a local earth site for reception and use in a personal computer at the local earth site. For present purposes, such a communication satellite service system is hereinafter identified as a digital personal computer system or "DPC". A DPC satellite communication service system may for instance supply satellite signals at carrier frequencies ranging from approximately 11.7 GHz to approximately 12.2 GHz, which DPC satellite signals are transmitted back to earth for reception at a receiver at the local site.

Accordingly, if a household for instance wishes to subscribe to more than one satellite service, this normally requires the installation of a separate antenna for each satellite service as well as a separate coaxial cable line for distributing the respective satellite service signals to the respective receivers at the local site. A household subscribing to several satellite services thus may require not only an array of satellite receive antennas which is very costly, but also requires the additional expenditures for installing more than the usual single coaxial cable line supplied to one or more rooms in the house.

In a pending application, U.S. Ser. No. 08/544,423 filed Oct. 10, 1995, assigned to the same assignee as herein, there is described a satellite receive antenna capable of simultaneously receiving signals from satellites at different geostationary positions. The aforementioned application Ser. No. 08/544,423 is incorporated herein by reference. This enables one to receive separate multiple satellite communication services signals on a single antenna which therefor eliminates the requirement for a costly antenna array for a household desiring to subscribe to more than one satellite communication service.

However, there is still a need to address the problems in distributing the received separate satellite signals at the outputs of such a dual satellite antenna. In particular, it is desired to distribute the satellite signals from separate multiple satellites on a signal cable line. Further, it is particularly desired to enable a user to access the communication signals from separate multiple satellites simultaneously at for instance different rooms within the household, while only using a single cable to each receiving device.

SUMMARY OF THE INVENTION

The present invention relates to a system for distributing satellite communication signals from separate multiple satellites on a single cable line. According to one aspect of the present invention, a dual satellite receiving antenna receives a first broadband signal at a first set of frequency bands corresponding to first satellite service signals, and a second broadband signal at a second set of frequency bands corresponding to second satellite service signals. A frequency converter using frequency division multiplexing receives and converts at least one of the sets of frequency bands to position the converted set of frequency bands adjacent to the other frequency band. A combiner receives the two adjacent frequency bands and distributes them on a single cable line to one or more receivers at the local site for access of the separate multiple satellite communication service signals by the receivers.

According to another aspect of the present invention, a dual mode or two-channel LNB provides both the right-hand polarized and the left-hand polarized signals of a DTV satellite system signal to be provided via separate lines. A frequency converter, utilizing frequency division multiplexing frequency converts the signals from a second satellite system, such as, DPC with each of the separate DTV-left-hand polarization and right-hand polarization signals to provide two adjacent bands of frequency signals, each of which is separately combined in a respective summer unit and distributed on a single coaxial line. A demultiplexer and switch selection circuitry is provided for receiving the two separate lines from the respective summer units and provides a plurality of single cable output lines on which each coupled receiver may simultaneously access any of the received separate satellite signals from the multiple satellites and on a single cable line supplied to the respective receiver.

DESCRIPTION OF THE PREFERRED EMBODIMENTS

Figure 1:
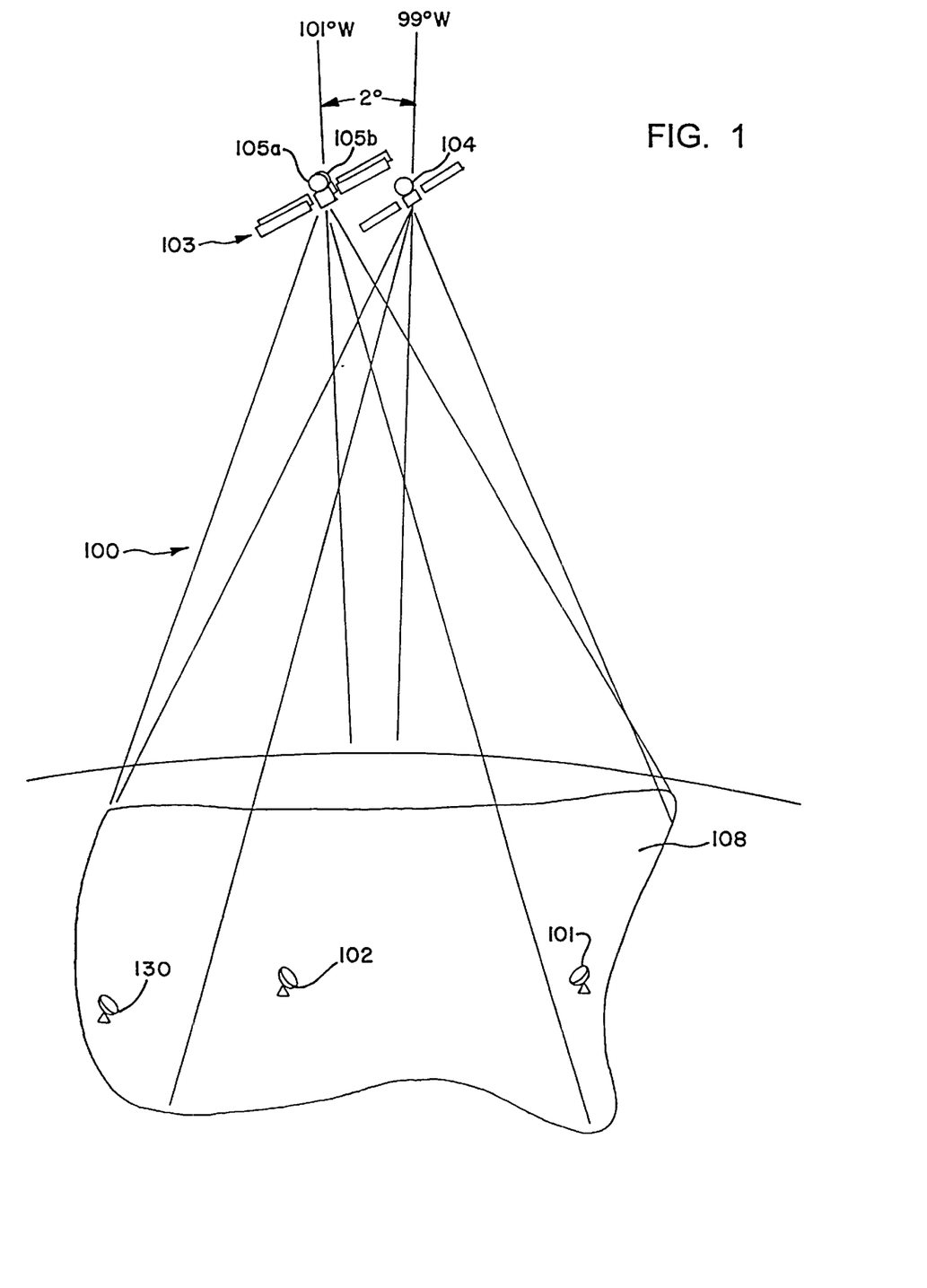
FIG. 1 illustrates a satellite system capable of using the present invention.

FIG. 1 illustrates a satellite system 100 capable of utilizing the present invention. The system 100 includes ground-based uplink transmitters 101, 102, a ground-based satellite receiver 130, and a space segment 103 consisting of orbiting satellites 104, 105a, 105b. In a typical application, the satellites 104, 105a, 105b are positioned at geostationary positions spaced approximately 2° of arc apart. For example, satellite 104 may be the Galaxy 4 satellite at 99.0° W longitude, and satellites 105a, 105b may be satellites DBS-1 and DBS-2, located at 101.2° W longitude and 100.8° W longitude.

Preferably, uplink transmitter 102 modulates a digital signal onto the assigned frequency carriers for uplink to satellites 105a, 105b. Satellites 105a, 105b translate the uplink carriers to the assigned Ku2-band downlink frequency carriers, (over 12 GHz), for downlink to the satellite receiver 130. The satellites 105a, 105b ordinarily transmit carrier signals with alternating left-hand circularly polarized (LHCP) and right-hand circularly polarized (RHCP) signals. Preferably, satellites 105a, 105 are high-power satellites that transmit downlink signals in a focused beam pattern 108. Similarly, the uplink transmitter 101 uplinks signals to satellite 104. The satellite 104 translates the carrier signals to the assigned C-band or Ku-band downlink frequencies for subsequent demodulation and downlink to the satellite receiver 130. The satellite 104, ordinarily transmits carriers with alternating vertical and horizontal polarity.

Figure 2:
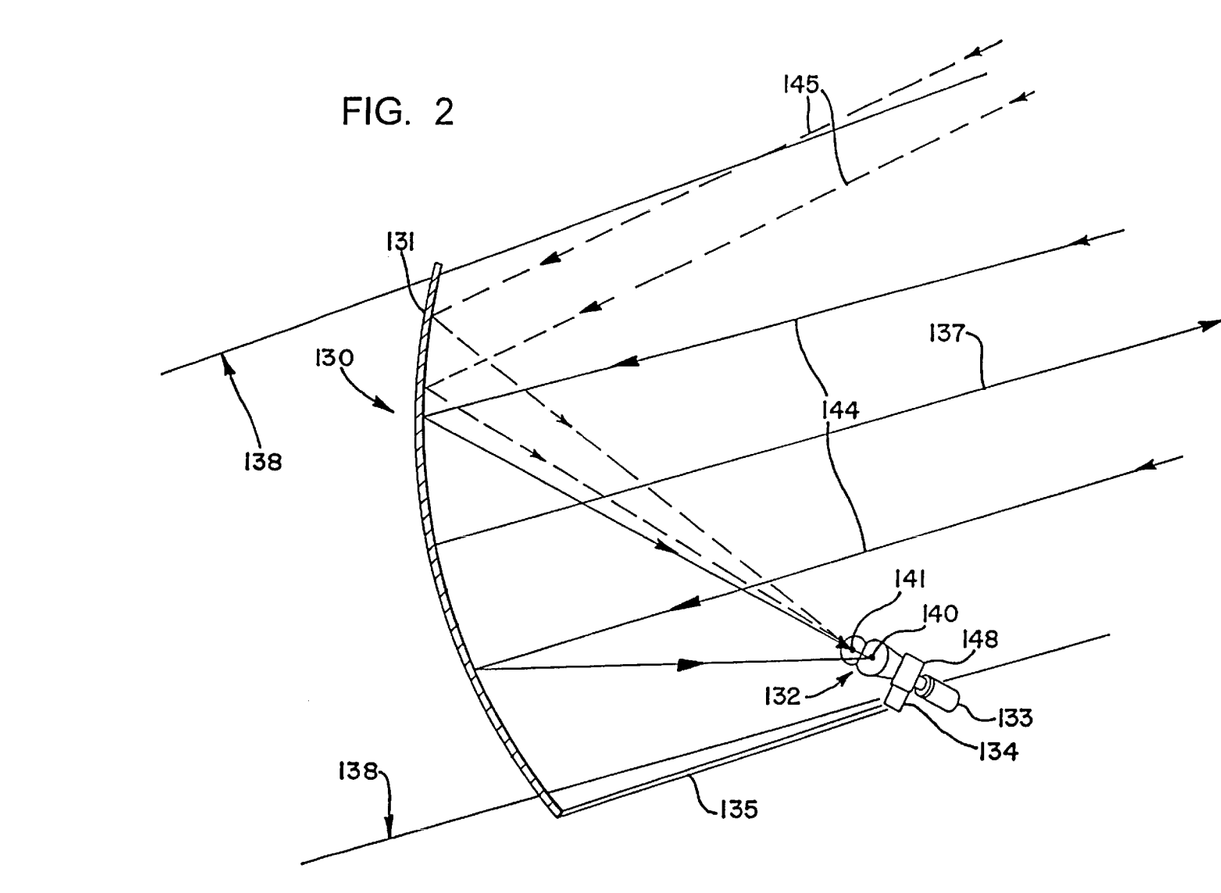
FIG. 2 is a diagram of a satellite receive antenna useful in connection with the present invention.

Referring to FIG. 2, a preferred embodiment of the satellite receiver 130 as described in the aforementioned pending application Ser. No. 08/544,423 incorporated by reference herein, has a small aperture antenna 131, a siamese feedhorn 132, two low noise blocks (LNB) 133, 134, and a feedhorn support arm 135. The antenna 131 has a boresight line 137, from which the antenna 131 receives signals with maximum gain, and a beamwidth 138 along the boresight. Signals 144 within the beamwidth 138 are reflected and focused by the antenna 131 to a focal point 140. Siamese feedhorn 132 and LNBs 133, are mounted on a feedhorn support arm 135 and positioned at the focal point 140.

When satellite services are desired from two satellites broadcasting at different power levels, the antenna 131 is most preferably aimed or boresighted at the satellite with the lower-power signal. For example, to receive signals from the satellite 104 at 99.0° W longitude and the higher-power satellites 105a, 105b at 100.8° W longitude and 101.2° W longitude, the antenna 131 is boresighted at the lower-power satellite 104 and 99.0° W longitude.

Figure 3:
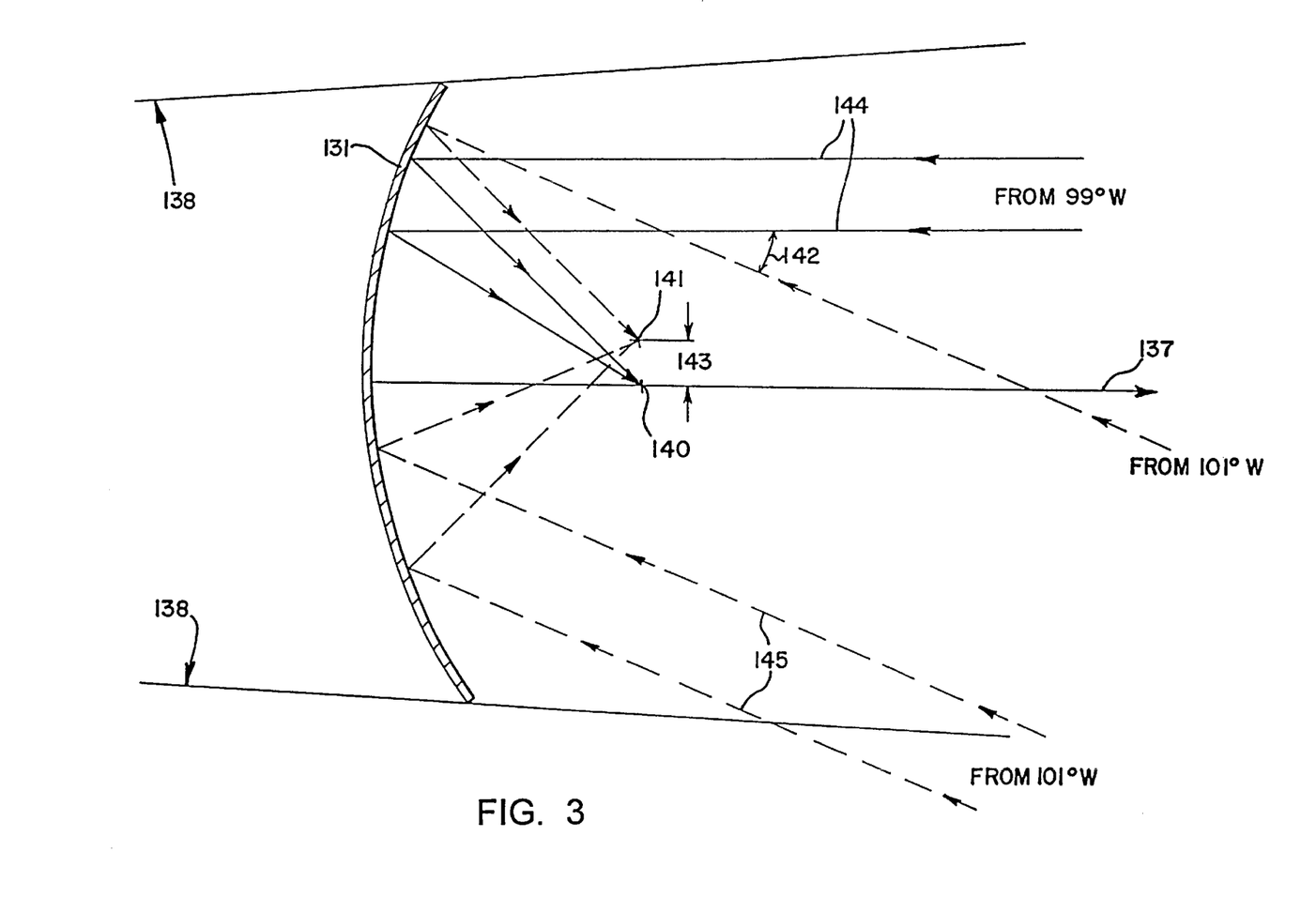
FIG. 3 is a top view diagram showing the satellite receive antenna shown in FIG. 2.

FIG. 3 is a top view diagram of the antenna 131 illustrating a typical focal point and offset region. The antenna 131 focuses satellite signals 144 from within its beamwidth 138 to a focal point 140. The antenna 131 has a beamwidth 138 of approximately 2.8° at the Ku-band. With the boresight 137 of the antenna 131 aimed at the 99.0° W location, the focal point 140 receives signals from 1.4° (2.8°/2) to either side of 99.0° W longitude, i.e., from 97.6° W to 100.4° W longitude. Signals 145 from the satellites 105a, 105b at approximately the 101° W longitude position are therefore not of sufficient strength to be seen by the focal point 140.

Signals 145 from a satellite outside the antenna beamwidth 138 are generally reflected by the antenna 131 to an offset region, and more particularly to an offset location 141. The offset location 141 may be chosen according to the separation between the satellites and the terrestrial antenna. Satellites 104 and 105a, 105b have different azimuth and elevation separation angles according to the terrestrial location of the antenna observing the satellites.

For all geographic locations in the continental United States, the difference in the observed azimuth angle 142 between the 99.0° W longitude satellite 104 and the 101° W.longitude satellites 105a, 105b ranges from a minimum of 2.82° to a maximum of 4.60°. For example, from Los Angeles, Calif., the satellites 105a, 105b appear about 2.65° apart from the satellite 104. From Laredo, Tex., the satellites 105a, 105b appear to be about 4.14° apart from the satellite 104. Because the difference in azimuth angles between the satellite 104 and the satellites 105a, 105b varies from Los Angeles to Laredo, the offset location 141 varies. However, a single azimuth angle difference 142 can be used by choosing a fixed distance 143 between focal point 140 and offset location 141, resulting in an azimuth angle 142 approximately halfway between the range of the possible azimuth angles.

Preferably, the offset location 141 is a distance 143 between 1.5 to 2.5 cm from the focal point 140. Providing an offset location 141 at a fixed 1.5 to 2.5 cm distance from the focal point 140 results in an azimuth angle 142 suitable for simultaneously receiving both the 99.0° W satellite 104 and the 101.0° W satellites 105a, 105b from most terrestrial locations throughout the continental United States. One skilled in the art can readily calculate the range of azimuth angle differences 142 and corresponding offset distances for other geostationary satellite positions and terrestrial locations. A suitable fixed offset distance 143 can thus be selected from the calculated range.

Figure 4:
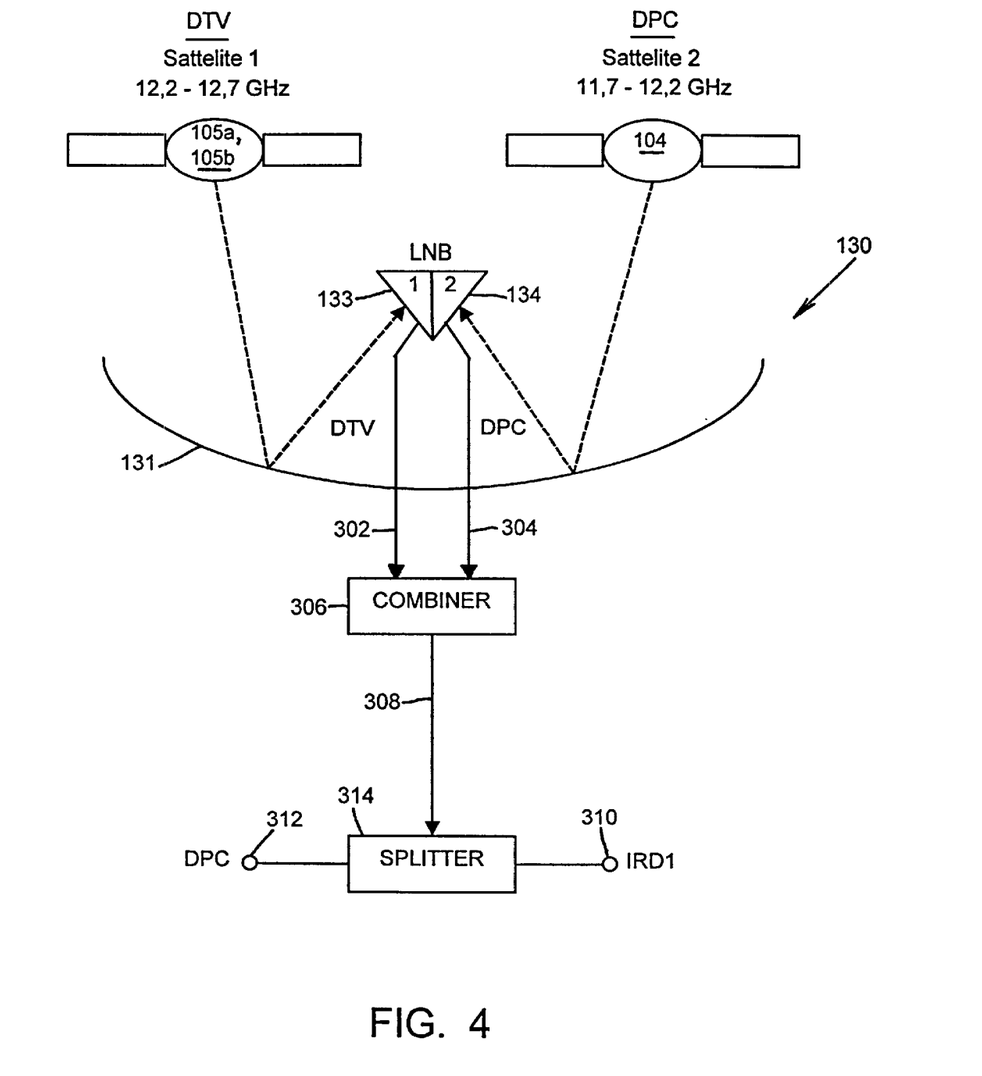
FIG. 4 is a schematic diagram illustrating a local earth site system for distributing separate multiple satellite communication services signals on a single cable line in accordance with the present invention.

Referring now to FIG. 4, there is illustrated the ground-based satellite receiver 130 at a local earth site, such as a household, with the receiving antenna 131 capable of receiving satellite signals from the separate satellites 105a, 105b as well as from the satellite 104. The downlink satellite signals from satellites 105a, 105b are typically between 12.2 GHz–12.7 GHz, and between about 11.7 GHz–12.2 GHz from satellite 104. For convenience, the satellite signals received from satellites 105a, 105b are referred to hereinafter as DTV communication signals which are the aforementioned Ku-band carrier signals with alternating left-hand circularly polarized (LHCP) and right-hand circularly polarized (RHCP) signals. The second satellite communication service signals received from satellite 104 will be hereinafter identified as DPC communication signals which are ordinarily in the aforementioned lower Ku-band of carrier signals with alternating vertical polarity (VP) and horizontal polarity (HP).

As shown in FIG. 4, each of the respectively received separate satellite signals from the separate satellites are focused by antenna 131 at a focal point where there the LNBs 133, 134 are located as previously described. An LNB is preferably comprised of an integrated low noise amplifier and a low noise frequency converter, and such devices are well-known to those skilled in the art. Reference may be made for instance to FIG. 5 where there is illustrated a representative LNB with an input 220 receiving signals from the antenna, and an output 229 coupling the intermediate frequency band to a receiver. Bandpass filters (BPF) 221, 222, 223 remove unwanted frequency signals while allowing desired signals to pass. Preferably, a field effect transistor (FET) amplifier 224, pre-amplifies the signal before it is mixed to the desired frequency. FET amplifier 224 is preferably a GaAs amplifier that provides a gain of 10 dB with a noise figure of 0.9 dB or less. Preferably, FET amplifier 224 provides a gain of 30 dB to 60 dB.

Figure 5:
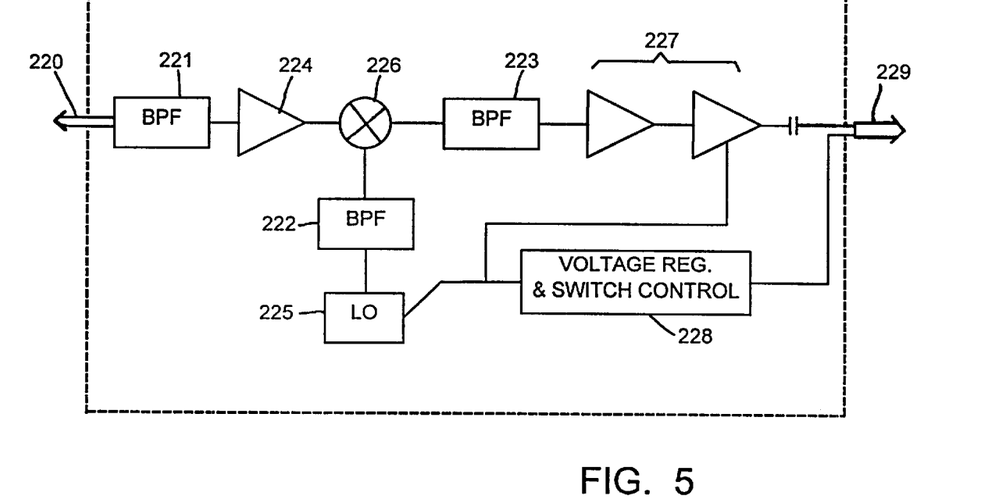
FIG. 5 is a block diagram of the low noise block (LNB) shown in FIGS. 2 and 4.

Local oscillator (LO) 225 and Schottky diode 226 mix the signal to the desired frequency. The signal is then amplified by amplifier stage 227 before being sent but on a shielded coaxial line 229 to an indoor receiver. A voltage regulator 228 preferably regulates the voltage provided by the LNB to the indoor receiver and incorporates a voltage level switch control for selecting either the right-hand or left-hand polarized signals in response to a switch control signal from the indoor receiver in a manner well-known to those skilled in the art.

The LNBs 133, 134 detect signals relayed from the feedhorn 132, convert the signals to an electrical current, amplify the signals, and downconvert the signals to a lower frequency. LNBs typically downconvert signals from the received satellite carrier frequencies to intermediate frequencies between 900 MHz and 2000 MHz. In the preferred embodiment, the LNB downconverts the satellite carrier signals to the intermediate frequency range of 950 to 1450 MHz.

Typically, only the RHCP signals or the LHCP signals are converted down to the intermediate frequency, depending on which particular receiver channel a DTV user is viewing. That is, when the viewer selects a particular DTV channel, an appropriate voltage switch control level is supplied to the LNB in a known manner to control the local oscillator 225 so as to provide either the RHCP or the LHCP signals for return to the indoor receiver. However, in systems having a dual mode or two-channel LNB, as well-known to those skilled in the art, both RHCP LHCP signals may be individually shifted down to a 500 MHz portion of L-Band (e.g. between 950 MHz and 1450 MHz) and provided, via separate lines, each like output line 229, to a set-top box or other integrated receiver and detector (IRD) associated with the receiver unit.

Accordingly, in FIG. 4, the output on line 302 is a DTV-left-hand or right-hand polarized signal in the frequency range 950–1450 MHz. On an output line 304 from the LNB 134, there is provided the DPC satellite signals at the intermediate frequency range also of 950–1450 MHz. A combiner 306 provides frequency division multiplexing to the two input signals on lines 302, 304 and locates the band of frequencies together so that they are adjacent and consecutive, thereby enabling them to be placed on a single coaxial cable line 308 for distribution to respective IRD and DPC units at respective terminals 310, 312, each of which is connected to a respective single coaxial line ultimately connected through a splitter 314 to the single coaxial line 308.

Figure 6:
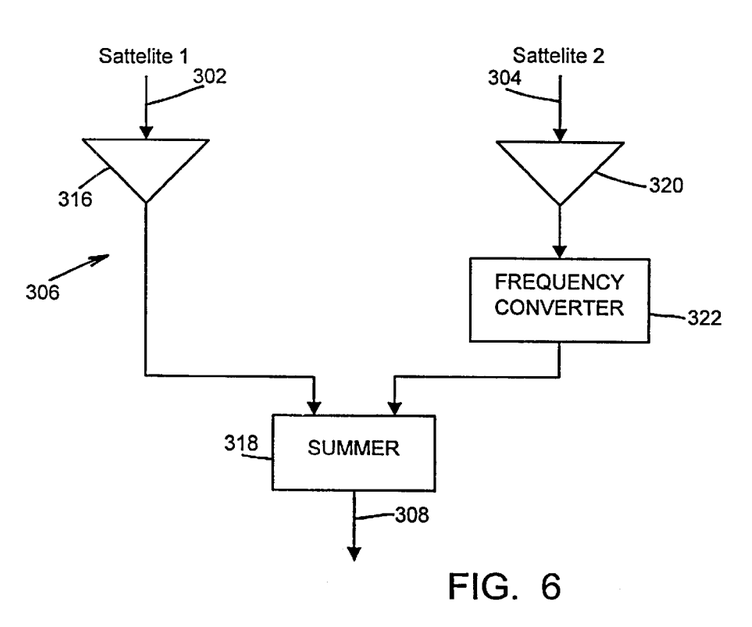
FIG. 6 is a block diagram illustrating the combiner of FIG. 4.

Referring to FIG. 6, there is illustrated the details of the combiner 306. Input line 302 containing the DTV, either left-hand or right-hand polarized signals is coupled to a buffer amplifier 316 and then supplied to a summer 318. Input line 304 containing the DPC frequency band also at 950–1450 MHz is coupled to a buffer amplifier 320 and thereafter coupled to a frequency converter 322 for upconverting the 95014 1450 MHz band to a band between about 1550–2050 MHz.

Figure 7A:
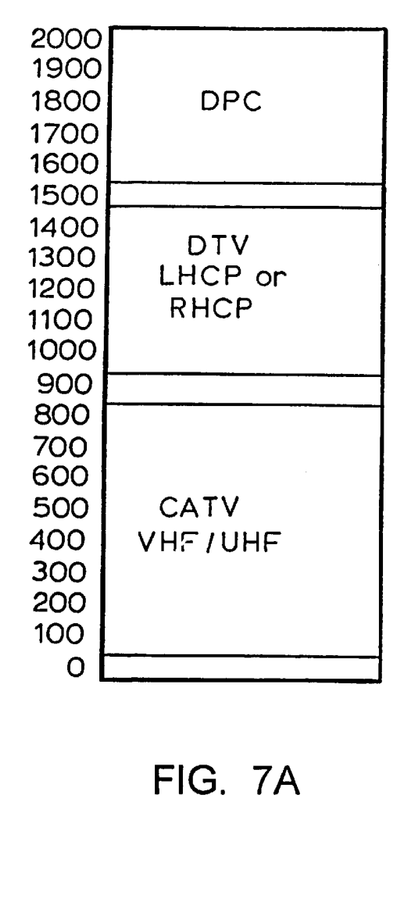
FIGS. 7(a), 7(b), 7(c) is a frequency distribution chart illustrating representative options for combining and frequency division multiplexing of the satellite signals from separate multiple satellites.

Reference may be made to FIG. 7(a) wherein the frequency distribution at the output of summer 318 on output line 308 is illustrated for convenience. As can be seen from this frequency distribution chart, the DPC band of frequencies has been located adjacent and consecutive with the DTV left-hand or right-hand polarized signals. For purposes of illustration, the lower band of frequencies between about 50 MHz to 850 MHz is illustrated as reserved for CATV or VHF/UHF cable signals which provide VHF/UHF broadcast channel signals in a known manner.

Figure 8:
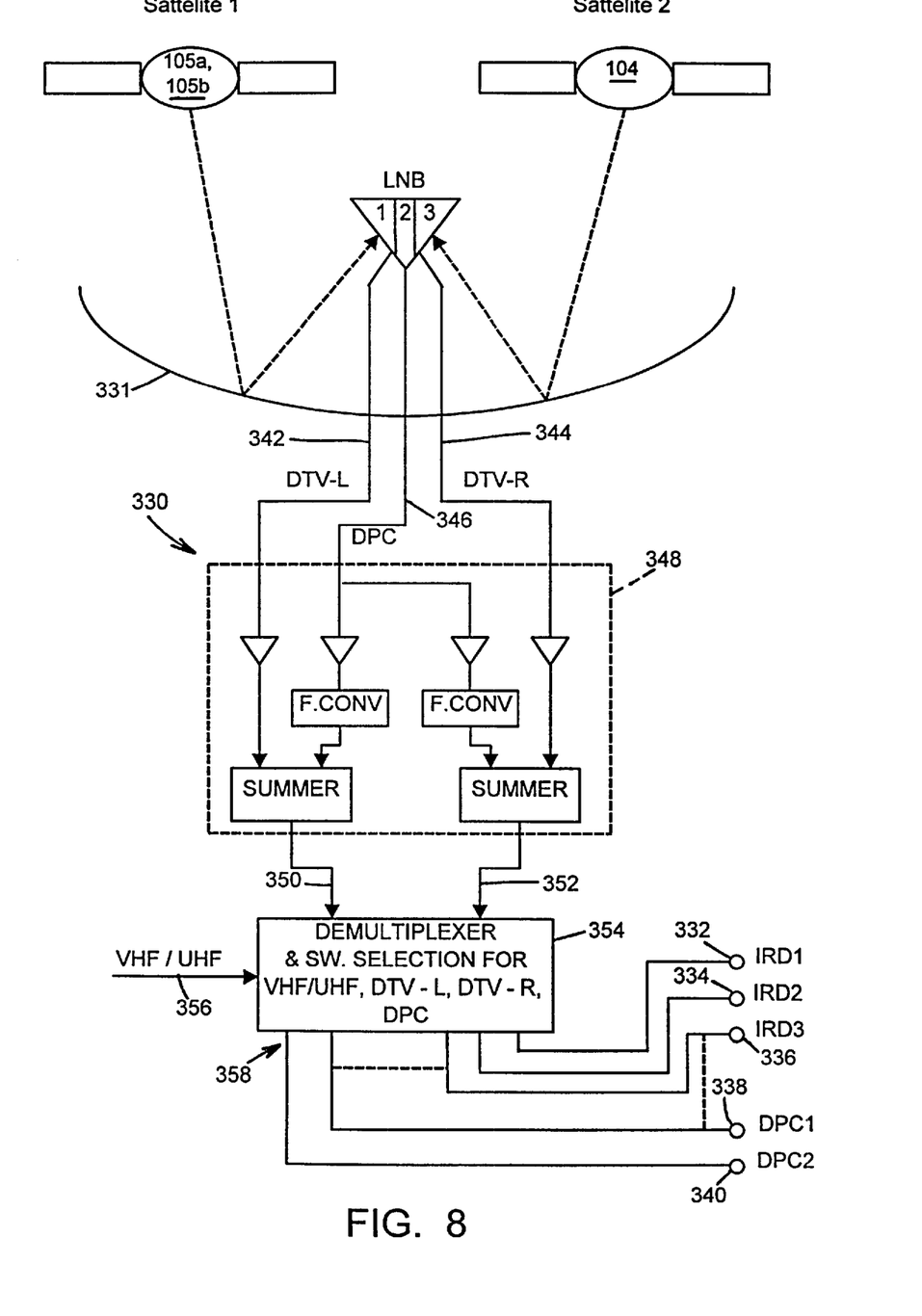
FIG. 8 is another embodiment of the present invention.

Reference may be made now to FIG. 8 wherein there is illustrated a local earth site distribution system 330 which enables each of the users at terminals 332, 334 . . . 340 to have access to both the left-hand as well as the right-hand DTV signals from satellites 105a, 105b, as well as having access to the DPC signals from satellite 104. In the embodiment 330 shown in FIG. 8, the receiving antenna 331 includes an LNB with three outputs. One of the LNB outputs is a downconverted intermediate frequency from satellite 105a, 105b representing the left-hand polarized signals in the range 950 MHz to 1450 MHz, and is labelled DTV-L and is supplied on output line 342. Similarly, output line 344 contains the downconverted right-hand polarized portion of the 950 MHz to 1450 MHz signals from satellites 105a, 105b and is indicated in FIG. 8 as DTVR. The third output line 346 of the LNB provides the downconverted intermediate frequencies received from satellite 104, and this output line is accordingly labelled DPC.

Figure 7B:
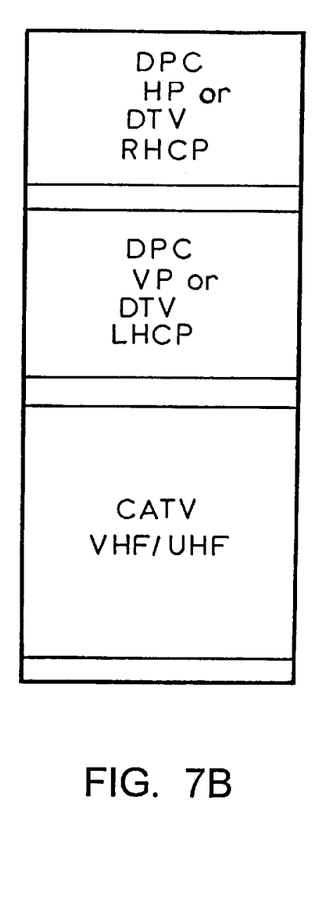
Figure 7C:
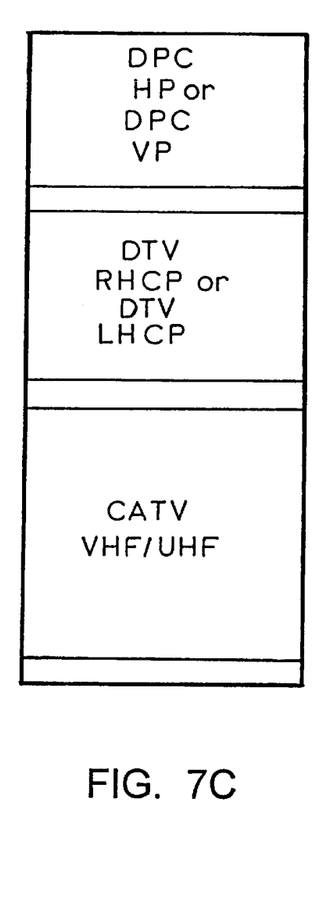

The three LNB output lines 342, 344, 346 are coupled to a combiner 348 which includes frequency converters and summers for providing frequency division multiplexing of the input signals. Reference may be made to FIG. 7(c) wherein there is illustrated the results of the frequency division multiplexing supplied by combiner 348. In particular, it can be seen from FIG. 7(c) that the DTV left-hand and right-hand polarized signals are available in the frequency range 950 MHz to 1450 MHz, whereas all of the DPC signals have been frequency converted and positioned in the 1550 MHz to 2050 MHz frequency band. The DTV-left-hand polarized signals and the DPC vertical polarized signals are provided on combiner 348 output line 350. The DTV right-hand polarized signals and the DPC horizontally polarized signals are provided on combiner 348 output line 352. FIG. 7(b) shows an alternative distribution of the DTV and DPC signals using frequency division multiplexing.

A demultiplexer 354 includes respective inputs for receiving output lines 350 and 352, and also an input line 356 containing VHF/UHF broadcast signals. Demultiplexer 354 includes output lines 358 each of which can supply any of the signals from input lines 350, 352 and 356 for coupling to the respective terminals 332, 334 . . . 340. For instance, the IRD 1 unit coupled to terminal 332 has access to all of the signals received from both of the separate satellites 105a, 105b as well as from satellite 104. Coupling of the selected signals is accomplished automatically in a well-known manner, such as by using voltage biased levels supplied from IRD 1 to a switch selector in the multiplexer 354 to accomplish the selection of the particular signal desired. This switch selection may be accomplished in a manner similar to that previously described with respect to existing LNBs. Demultiplexer 354 is a standard commercially available unit, such as Channelmaster model 63141FD, or similar available units such as.

Accordingly, it can be seen that in either of the illustrated embodiments, separate multiple satellite communication service signals are supplied on a single cable line at the local earth receiver site. Secondly, with respect to the embodiment shown in FIG. 8, all of the communication satellite signals from each of the separate satellites is available simultaneously on each of the single cable lines connected, for instance, to terminals 332, 334, 336, 338, 340.

The foregoing detailed description has been given for clearness of understanding only, and no unnecessary limitations should be understood therefrom, as modifications will be obvious to those skilled in the art.

What is claimed is:

1. An apparatus comprising:
   a first LNB that is configured to downconvert satellite signals having a first polarization;
   a second LNB that is configured to downconvert satellite signals having a second polarization different from the first polarization; and
   a frequency division multiplexing unit that is configured to frequency division multiplex the downconverted satellite signals from the first LNB and the downconverted satellite signals from the second LNB for placement onto a single output line.

2. An apparatus according to claim 1, wherein the first and second LNBs downconvert to the same frequency band.

3. An apparatus according to claim 2, wherein the frequency band is the 950–1450 MHz band.

4. An apparatus according to claim 1, wherein the first LNB and the second LNB are provided for the same satellite dish.

5. An apparatus according to claim 1, wherein the frequency division multiplexing places the downconverted satellite signals from the first LNB and the downconverted satellite signals from the second LNB in adjacent frequency bands.

6. An apparatus according to claim 1, wherein the satellite signals having the first polarization and the satellite signals having the second polarization are from the same frequency band.

7. An apparatus according to claim 6, wherein the frequency band is Ku-band.

8. An apparatus according to claim 1, wherein said frequency division multiplexing unit comprises (a) a frequency converter that upconverts the downconverted satellite signals from the second LNB and (b) a summer that sums the downconverted satellite signals from the first LNB with the output of said frequency converter, thereby effecting the frequency division multiplexing.

9. An apparatus according to claim 1, wherein the satellite signals having the first polarization and the satellite signals having the second polarization are transmitted by different satellites.

10. A method comprising:
    receiving output from low-noise block circuitry to which was input a first Ku-band satellite signal having a first polarization and a second Ku-band satellite signal having a second polarization different from the first polarization; and
    placing the output corresponding to the first and second signals in different frequency bands for output on the same output line.

11. A method according to claim 10, wherein the low-noise block circuitry downconverts the first Ku-band satellite signal and the second Ku-band satellite signal to the same intermediate frequency band, and wherein said placing step shifts the downconverted second Ku-band satellite signal from the intermediate frequency band to a higher frequency band.

12. A method according to claim 10, wherein the first Ku-band satellite signal having the first polarization and the second Ku-band satellite signal having the second polarization are transmitted by different satellites.

13. An apparatus comprising:
    means for receiving output from low-noise block circuitry, the input to the low-noise block circuitry comprising a first Ku-band satellite signal having a first polarization and a second Ku-band satellite signal having a second polarization different from the first polarization; and
    means for placing the output corresponding to the first and second satellite signals in different frequency bands for output on the same output line.

14. An apparatus according to claim 13, wherein said placing means comprises frequency division multiplexing means.

15. An apparatus according to claim 13, wherein said placing means places the output corresponding to the first and second satellite signals in adjacent frequency bands.

16. An apparatus according to claim 13, wherein the first Ku-band satellite signal having the first polarization and the second Ku-band satellite signal having the second polarization are transmitted by different satellites.

* * * * *